US005086389A

United States Patent [19]

Hassett et al.

[11] Patent Number: 5,086,389

[45] Date of Patent: Feb. 4, 1992

[54] AUTOMATIC TOLL PROCESSING APPARATUS

[76] Inventors: John J. Hassett, 32 Pond St., Marblehead, Mass. 01945; John M. Harrison, 17 Dartmouth St., Concord, N.H. 03301

[21] Appl. No.: 524,654

[22] Filed: May 17, 1990

[51] Int. Cl.[5] .................... G06F 15/21; G07B 15/00; G08G 1/00

[52] U.S. Cl. .................... 364/401; 235/384; 340/928

[58] Field of Search .................... 235/384; 364/401, 400; 340/928

[56] References Cited

U.S. PATENT DOCUMENTS

| | | | |
|---|---|---|---|
| 3,602,881 | 8/1971 | Bayne | 340/928 |
| 4,031,513 | 6/1977 | Simciak | 340/870.18 X |
| 4,303,904 | 12/1981 | Chasek | 235/384 |
| 4,338,587 | 7/1982 | Chiapetti | 340/928 |
| 4,481,428 | 11/1984 | Charlot, Jr. | 340/870.26 X |
| 4,501,958 | 2/1985 | Glize et al. | 235/382 |
| 4,786,903 | 11/1988 | Grindahl et al. | 340/825.540 |
| 4,937,581 | 6/1990 | Baldwin et al. | 342/44 |

FOREIGN PATENT DOCUMENTS

| | | |
|---|---|---|
| 0159526 | 7/1987 | Japan . |
| 0288399 | 11/1988 | Japan . |

OTHER PUBLICATIONS

Desmond, "Toll Booth Net Automates Fare Collection, Saves Cash", *Network World*, vol. V6, Issue n23, 6/12/89.

*Primary Examiner*—Dale M. Shaw
*Assistant Examiner*—David Huntley
*Attorney, Agent, or Firm*—Lahive & Cockfield

[57] ABSTRACT

A system for automatic collection of tolls includes a toll facility, an in-vehicle toll processor having memory for storing a toll-money-available quantity purchased by the user, and a toll-facility-identification site that transmits a toll-facility-identifier signal indicating the identity of the upcoming toll facility and the toll to be collected. As the vehicle approaches the identification site, the in-vehicle processor receives the identifier signal and calculates the toll be be debited. When the vehicle passes through the toll facility, the facility transmits a toll-collect signal instructing the in-vehicle toll processor to debit the calculated toll from memory. The in-vehicle processor debits the calculated amount and transmits an acknowledgement signal to the toll facility.

12 Claims, 7 Drawing Sheets

AUTOMATIC TOLL PROCESSING APPARATUS

BACKGROUND OF THE INVENTION

This invention relates generally to systems for vehicle toll collection, and, more particularly, relates to apparatus and methods for automatic, non-contact, high-speed collection of vehicular tolls.

An increasing number of vehicles are travelling over progressively more congested highways. The collection of tolls by conventional means has had a negative effect upon highway throughput and safety. Congestion and long backups on toll plazas are becoming more common. Such conditions involve a significant economic cost, through lost time, and reduced productivity. Moreover, serious accidents at toll plazas, caused by operator or mechanical failure, have also increased in frequency.

Certain toll authorities have attempted to respond to these problems by providing coin-operated toll collection devices, or by instituting a toll-plate system in which toll-takers visually inspect each incoming vehicle for an appropriate toll plate or sticker. Coin-operated toll collection systems, however, do little to increase throughput, and are susceptible to fraud, through the use of counterfeit coins. Toll-plate systems suffer the same deficiencies, requiring each vehicle to slow sharply while entering the visual inspection area; these systems also rely heavily on toll-taker attentiveness.

Additionally, a number of systems have been proposed for utilizing radio frequency identification (RFID) techniques for toll collection. Under these systems, drivers acquire a "tag" or card that acts as a reflective transmitter or discrete transmitter to identify the vehicle by serial number as it passes through a toll booth. This technique is also referred to as Automatic Vehicle Identification (AVI).

This system also suffers from a number of deficiencies. In particular, because the RFID tag lacks a machine-intelligent processor for manipulation and storage of accounts, toll authorities must maintain individual toll accounts for all users of the system. This becomes especially burdensome in urban areas or regions of high toll traffic volume. Toll agencies would need to manage hundreds of thousands of individual accounts, a burden that is created by operation of the AVI system.

Additionally, because the RFID tags lack a processor or user interface, vehicle operators cannot readily ascertain account balances, and have no warning as to limited or exhausted credit. This creates both confusion, and potential safety hazards, as drivers cross over to conventional toll collection lanes with little warning.

Further, in the absence of a single national toll agency, each participating driver would need to have multiple cards attached to the vehicle, each corresponding to a separate toll authority account.

The RFID system also raises user-privacy issues by requiring the generation and storage of detailed vehicle-specific travel records.

It is accordingly an object of the invention to provide improved toll collection methods and apparatus that significantly increase the traffic capacity of roadways.

Another object of the invention is to provide toll collection methods and apparatus that increase the rate of toll collection while enhancing highway safety.

A further object of the invention is to provide such methods and apparatus that are convenient to use and support toll collection by a plurality of toll authorities.

Yet another object of the invention is to provide toll collection systems that reduce administrative burdens, facilitate the generation of transaction reports for users and toll authorities, and preserve the privacy of users.

It is a further object of the invention to provide toll collection systems that are reliable and resistant to attempts at fraud or toll evasion, and which are readily integrated into existing toll management systems.

Other general and specific objects of the invention will in part be obvious and will in part appear hereinafter.

SUMMARY OF THE INVENTION

The foregoing objects are attained by the invention, which provides methods and systems for automatically collecting tolls from a vehicle moving at high speed along a roadway.

One aspect of the invention includes at least a first toll facility through which the vehicle can pass for toll collection, and an in-vehicle toll processor having storage for storing a toll-money-available signal representative of a monetary quantity available for debiting in a toll transaction at an upcoming toll facility. Initially, the toll processor is loaded at a toll facility with an electronic gross-toll-amount signal representative of an initial toll-money-available value, A first toll-facility-identification site, corresponding to and remote from a first toll facility collection site, transmits a first toll-facility-identifier signal uniquely representative of (i) the location of the first toll facility and (ii) a toll schedule corresponding to the roadway. As the moving vehicle approaches the first toll-facility-identification site, the in-vehicle toll processor receives and stores the first toll-facility-identifier signal, and calculates, in response to the first toll-facility-identifier signal, a toll amount to be debited at the first toll facility.

In particular, the in-vehicle toll processor compares the calculated toll amount with the toll-money-available signal stored in the in-vehicle processor, to test whether the monetary quantity represented by the toll-money-available signal is greater than or equal to the calculated toll amount. The in-vehicle toll processor responds to a selected result of this comparison by providing the vehicle operator with a signal representative of permission to utilize the first automated toll facility.

Subsequently, as the vehicle passes through the first toll facility collection site, the first toll facility collection site transmits a toll-collect signal instructing the in-vehicle toll processor to debit the calculated toll amount from its storage. The in-vehicle toll processor responds by debiting the calculated toll amount from its storage, reducing the value of the toll-money-available signal in accordance with the amount debited. Additionally, the in-vehicle toll processor transmits an acknowledgement signal indicating to the toll facility collection site that the calculated toll amount has been debited from storage.

In another aspect of the invention, when the comparison executed by the in-vehicle toll processor indicates that the toll money available is less than the calculated toll amount, the in-vehicle toll processor responds by providing the vehicle operator with an alarm signal, indicating that the operator should proceed to a conventional toll collection facility.

A further aspect of the invention provides for operation on a progressive toll roadway, on which toll amounts depend upon where the vehicle enters and where it exits the tollway. In this aspect the invention includes at least a second toll facility remote from the first toll facility, with a second toll-facility-identification site corresponding to and remote from a second toll facility collection site. The second toll-facility-identification site transmits a second toll-facility-identifier signal uniquely representative of (i) the location of the second toll facility and (ii) the toll schedule corresponding to the roadway.

The in-vehicle toll processor receives the second toll-facility-identifier signal, and if the vehicle did not previously pass through the first toll collection facility, the in-vehicle toll processor overwrites the stored first toll-facility-identifier signal with the second toll-facility-identifier signal.

In one aspect of the invention, the toll-facility-identifier signals, the toll-collect signal, and the acknowledgement signals are encoded radio-frequency signals, and the encoding can be dynamically varied to reduce the possibility of fraud, or to carry additional selected information.

The invention will next be described in connection with certain illustrated embodiments; however, it should be clear to those skilled in the art that various modifications, additions and subtractions can be made without departing from the spirit or scope of the claims.

BRIEF DESCRIPTION OF THE DRAWINGS

For a fuller understanding of the nature and objects of the invention, reference should be made to the following detailed description and the accompanying drawings, in which.

DESCRIPTION OF ILLUSTRATED EMBODIMENTS FIXED TOLL ROAD OPERATION

Figure 1:
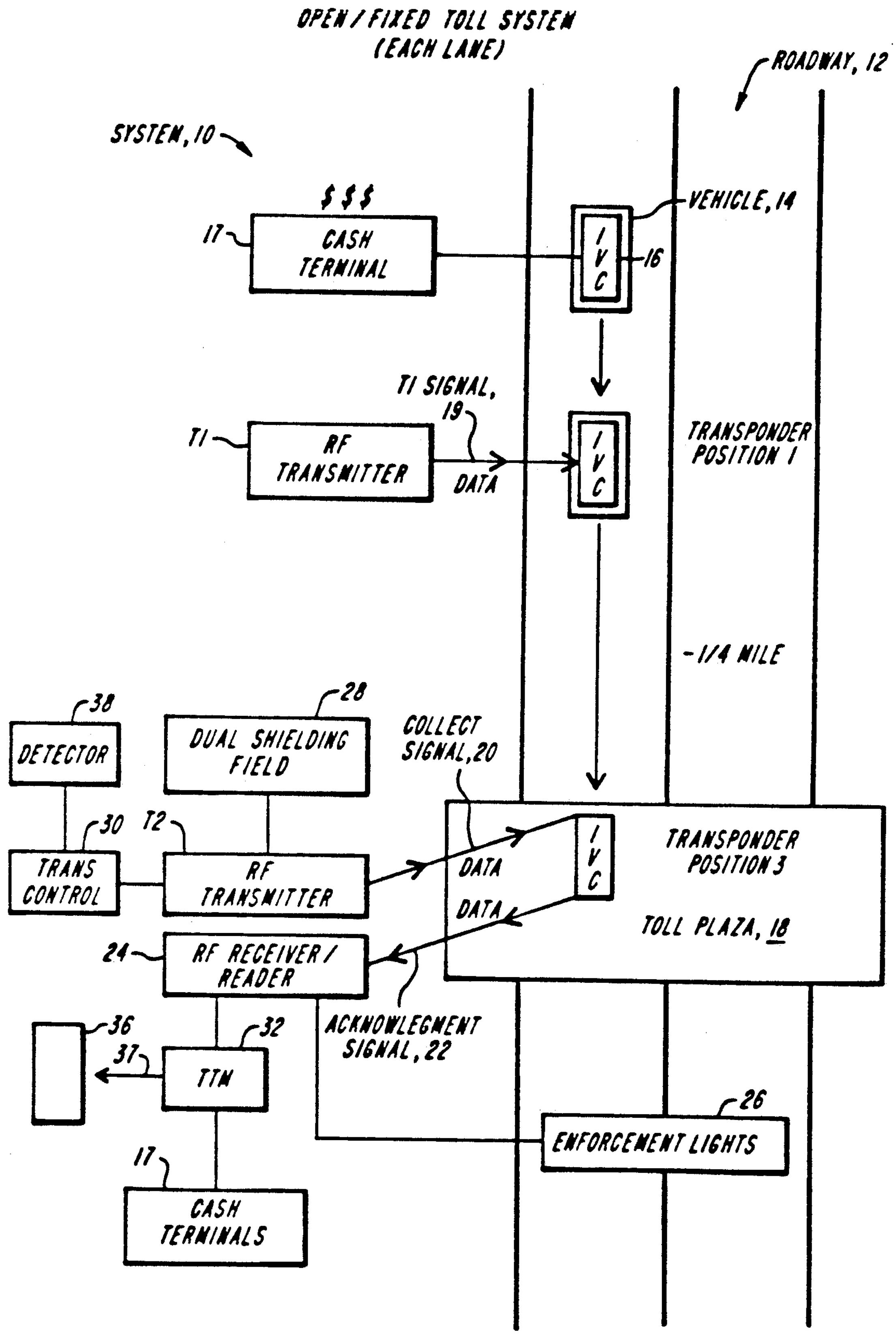
FIG. 1 is a schematic block diagram depicting an automatic toll collection system in accordance with the invention, adapted for use on fixed toll roads.

FIG. 1 depicts the overall structure and operation of an electronic toll collection system 10 constructed in accord with the invention, for use on fixed toll roads, or on bridges or tunnels. The illustrated embodiment enables automatic collection of toll charges from vehicles moving through a toll facility or plaza at speeds between zero and approximately sixty miles per hour. Vehicles need not halt or slow significantly for toll collection.

For purposes of simplicity, FIG. 1 shows only a single-lane road 12, on which the direction of travel for a given vehicle 14, referred to herein as the "downstream" direction, is indicated by arrows. Those skilled in the art will appreciate that the invention can be practiced in connection with multi-lane, divided roadways, or in railway networks or other transport systems.

The illustrated embodiment includes two primary components. The first is a communications system having two transmitter modules, referred to as T1 and T2. These transmitters will typically be owned by the toll authority and situated on toll authority property. The second component is an in-vehicle toll processor or in-vehicle component (IVC) 16 purchased or leased by vehicle operators. As described below, the IVC 16 contains a transponder, microprocessor, and memory, for storing, manipulating, and reporting on a quantity representative of money available to the vehicle for debiting in toll transactions. The IVC controls and processes toll-related debit/credit transactions, including extraction of toll charges, by communicating with T1 and T2.

As indicated in FIG. 1, the T1 transmitter is situated adjacent to the roadway 12, approximately one-quarter to one-half mile upstream from the toll plaza 18, such that vehicles moving at speeds between zero and approximately sixty miles per hour encounter the T1 signal well before encountering the toll plaza. The T1 module radiates an electromagnetic "toll-facility-identifier" signal that identifies the upcoming toll plaza. In the illustrated embodiment, the signal generated by T1 is a radio frequency (RF) signal.

The second transmitter module, T2, is situated at the toll plaza. The T2 module is a transmitter/sensor device that initiates the toll transaction by transmitting an encoded COLLECT signal 20, as described below.

In the embodiment depicted in FIG. 1, toll transactions occur in the following manner: At some time prior to the vehicle's arrival at the toll collection plaza, a toll authority agent at a toll credit facility 17 loads the IVC with a value representative of an initial toll-money-available quantity purchased by the vehicle operator. The IVC is also loaded with a code representative of the class of vehicle in which the IVC is installed. (This aspect of the invention is further described hereinafter.) The vehicle operator places the IVC in the vehicle and proceeds along the roadway. Approximately one-quarter mile to one-half mile from the toll plaza, the vehicle and IVC pass through a radio field 19 generated by transmitter T1. The T1 radio signal 19 contains a toll code identifying the upcoming toll collection facility. In one embodiment of the invention, the toll code also includes the toll schedule for the roadway, specifying the toll due for various classes of vehicles. For IVC units used only on fixed toll roadways, the schedule can be stored in the IVC.

Based on the information provided to the IVC by the T1 transmitter, the IVC calculates the appropriate toll due for the class of vehicle in which the IVC is installed. The IVC reads this information and interrogates its memory, to test whether a sufficient toll-money-available balance exists in the account corresponding to the toll authority for the roadway. If the toll-money-available quantity in the appropriate account exceeds the cost of the upcoming toll, the IVC generates a perceptible "PROCEED" message on an associated visual display element, to indicate to the vehicle operator that he or she may proceed through the automated toll facility.

If the cost of the upcoming toll exceeds the toll-money-available quantity for the relevant account, the IVC generates an appropriate alarm message, which can include, for example, an audible alarm and a visual display such as "INSUFFICIENT—MERGE LEFT." The vehicle operator is thereby advised to proceed to a standard toll booth.

Assuming a sufficient toll-money-available balance is indicated in the appropriate tollway authority account, a confirmatory user-perceptible signal is generated and the vehicle and IVC proceed to an electronic toll collection lane.

Referring again to FIG. 1, as the vehicle passes through the toll collection facility at a speed of approximately 0–60 miles per hour, the (T2) transmitter transmits a COLLECT signal 20 that instructs the IVC to debit the calculated toll amount from the toll-money-available quantity stored in its memory. In response, the IVC debits the calculated amount and transmits an acknowledgement signal 22 to the T2 indicating that the IVC has executed an appropriate debit transaction. As further described below, a reader unit 24 at the toll collection facility receives the acknowledgement signal and energizes a green light in an enforcement light array 26.

When the toll transaction is completed, the toll-money-available quantity stored in IVC memory is reduced by an amount corresponding to the toll, and the toll-money-available balance remaining in the account is displayed.

The IVC can store different toll-money-available signals corresponding to a plurality of toll authority accounts, in a manner described in greater detail hereinafter. A single IVC is thus operative for toll collection by multiple toll authorities. This feature of the invention is especially advantageous in geographical regions having roads, bridges and tunnels governed by several toll authorities.

While FIG. 1 depicts only one T2 module, governing a single lane, the invention can also be practiced in connection with multiple automated lanes, each governed by a respective one of a plurality of T2 transmitters. In order to reduce the possibility of RF crosstalk between multiple lanes, and to increase longitudinal discrimination between individual vehicles in a single lane, an RF shielding module 28 is provided. The operation and structure of the shielding field module is discussed below.

The illustrated system includes a transmitter control element 30, for directing the T2 transmitter to emit the COLLECT signal when the proximity of a vehicle is detected by a vehicle detector 38, a reader unit 24 for receiving the IVC acknowledgement signals, enforcement lights 26 for indicating vehicle class and identifying any vehicle that proceeds without generating a proper acknowledgement signal, a Toll Transaction Management (TTM) system 32 for recording toll transactions for the toll authority, and cash terminals 17 coupled to the TTM for enabling vehicle operators to purchase prepaid toll-money-available quantities. The structure and function of these elements are described in greater detail hereinafter.

FIG. 1 thus depicts an embodiment of the invention adapted for employment on fixed toll roadways. The invention can also be practiced on progressive toll roadways, in the embodiment depicted in FIG. 2.

Progressive Toll Road Operation

Figure 2:
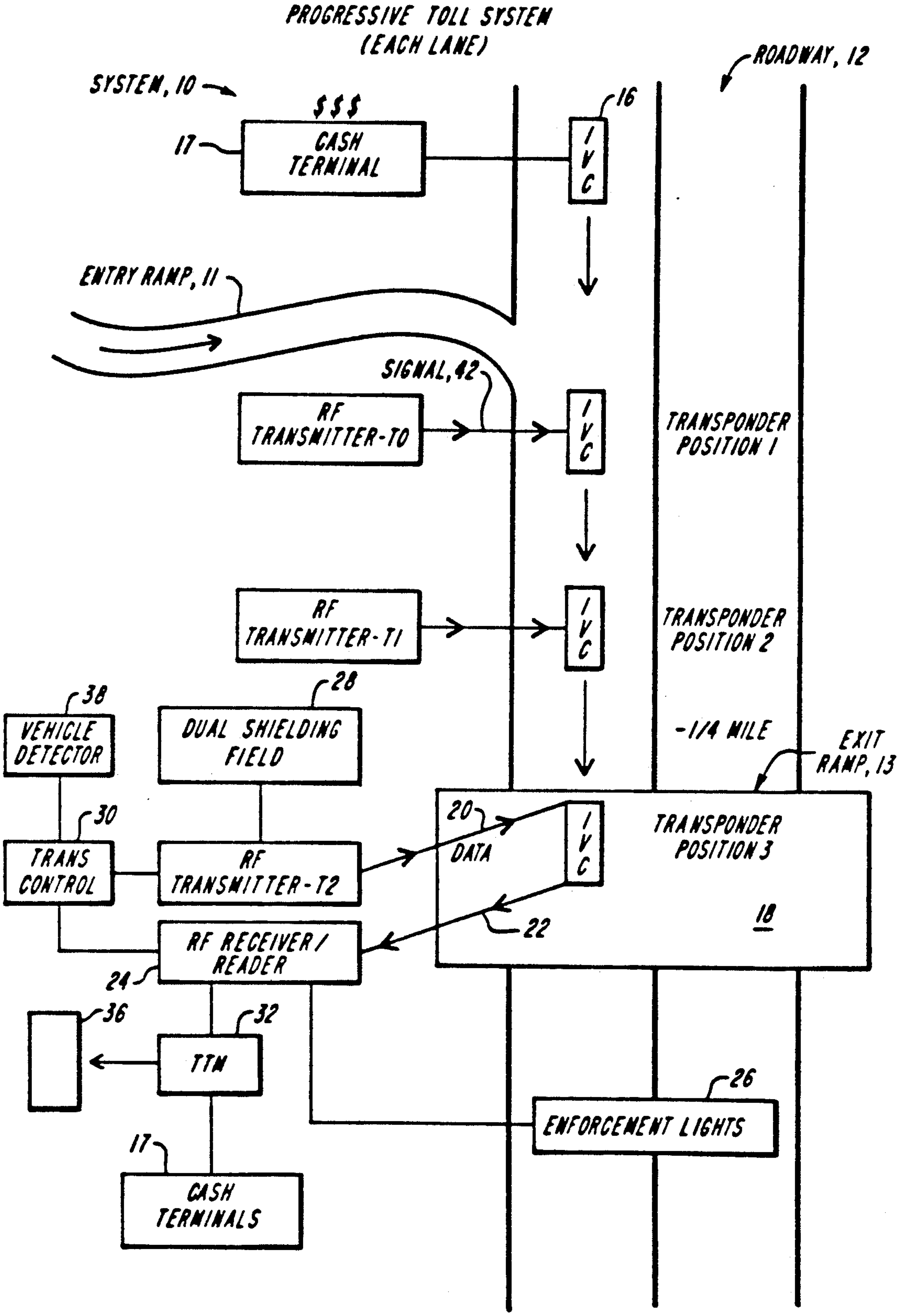
FIG. 2 is a schematic block diagram of another embodiment of the invention, adapted for use on progressive toll roads.

The system 10 illustrated in FIG. 2 is adapted for use on progressive tollways such as turnpikes, where toll values are calculated on the basis of known entry and exit points. On such roads, vehicles enter and exit the roadway via selected on-ramps and exit ramps, selecting a given exit and passing others. Typically, a separate toll facility is located at each exit ramp.

The progressive toll embodiment of the invention utilizes the IVC, T1, and T2 transmitters discussed above in connection with the fixed toll system. Additionally, as indicated in FIG. 2, another transmitter, referred to herein as a T0 transmitter, is located adjacent to each on-ramp 11 to the progressive toll road 12. Each T0 transmitter emits an entry-point-identifier signal 42 uniquely identifying the on-ramp to which the T0 corresponds. This signal is used to advise the IVC of the vehicle's entry point onto the progressive toll highway.

As the vehicle enters the tollway, the vehicle and IVC pass through the (T0) radio field that contains the encoded entry-point-identifier signal 42 specifying the entry ramp location or entry ramp number to the IVC. The IVC stores this information in its memory element.

Approximately one-quarter to one-half mile from each exit ramp plaza, the vehicle and IVC approach the T1 transmitter and receive the T1 encoded toll-facility-identifier signal identifying the upcoming exit ramp toll collection facility. The T1 signal also specifies the toll schedule for the roadway. This toll schedule includes distance/cost and vehicle class/cost data.

In response to the T1 signal data, and based on the T0 entry-point data stored in the IVC, the IVC calculates the appropriate toll due for the vehicle in which the IVC is installed.

The IVC reads this toll data and interrogates its memory to test whether a sufficient toll-money-available balance exists in the account corresponding to the toll authority for the roadway.

If the cost of the upcoming toll exceeds the toll-money-available quantity for the relevant account, the IVC generates user-perceptible alarm messages, which can include, for example, an audible alarm and a visual display such as "INSUFFICIENT FUNDS—MERGE LEFT." The vehicle operator is thereby advised to utilize a standard toll booth if the operator elects to exit the tollway at the upcoming exit ramp.

If the toll-money-available quantity in the appropriate account equals or exceeds the cost of the upcoming toll, the IVC generates a perceptible "PROCEED" message on its display element, to indicate to the vehicle operator that he or she may proceed through the automated toll facility if the operator elects to exit the tollway at the upcoming exit ramp.

Operation at the toll facility then proceeds in a manner similar to that described above in connection with the fixed toll embodiment of the invention.

If the operator of the vehicle elects not to exit the tollway at the upcoming exit ramp, and instead chooses to pass the current exit and proceed to a subsequent exit, the vehicle and IVC will encounter at the next exit ramp a subsequent T1 transmitter, corresponding to, and spaced apart from, the subsequent exit ramp toll collection facility. In response to receiving this new T1 signal, the IVC stores the new T1 data in memory, overwriting the old T1 data. The T0 entry-point information is retained, however, and the IVC executes a new toll calculation and toll-money-available test, based on the T0 data and new T1 information. This cycle is repeated for each automated exit facility that the vehicle operator elects to pass. The T0 entry-point information is erased from memory after receipt of a T2 TOLL-COLLECT signal at a toll collection facility, or upon receipt of new T0 data, which occurs when the vehicle re-enters a progressive toll road.

In the illustrated embodiments, the T1 transmitter is located approximately one-quarter to one mile from the T2 transmitter to avoid improper detection of T1 signals by IVC units approaching the toll facility from the opposite direction. Additionally, to assure that a T1 does not improperly reset an IVC approaching from the opposite direction before the IVC passes through its respective T2, the T1 transmitter can be angled towards oncoming traffic and away from the opposite direction of traffic.

The IVC

Figure 3:
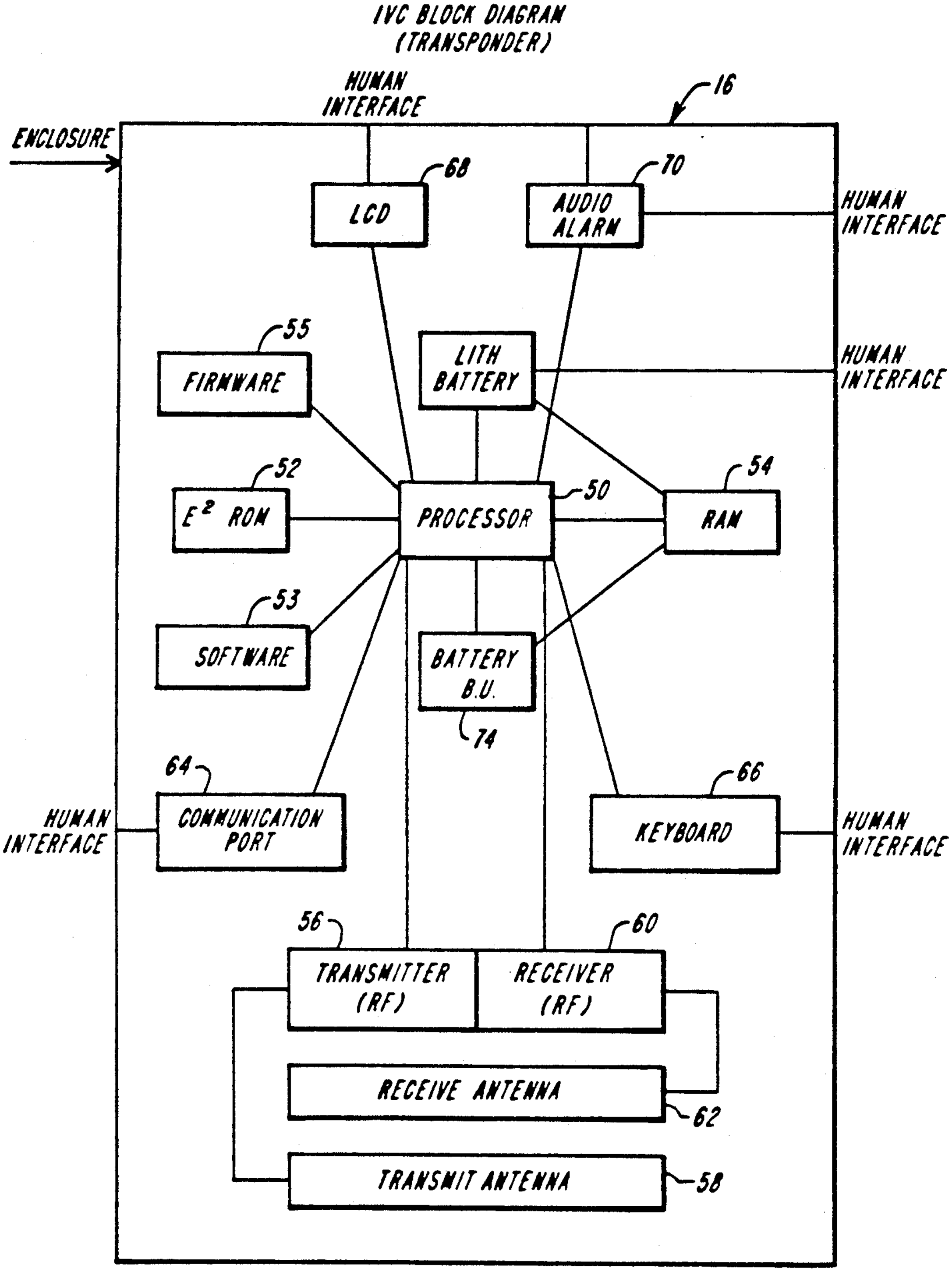
FIG. 3 is a schematic block diagram depicting detail of an in-vehicle component (IVC) utilized in the embodiments of FIGS. 1 and 2.

FIG. 3 depicts detail of the IVC 16. The IVC includes a processing element 50, an associated EPROM 52 for storing control software 53, a CMOS RAM element 54 for storing toll-money-available quantities and other data, control firmware 55, an RF transmitter 56 and associated antenna module 58, an RF receiver 60 and associated antenna module 62, user interface elements 66, 68, 70, a bi-directional communications port 64, and power supply elements.

The processing element 50 can be an 8086 or other microprocessor capable of executing the calculations necessary to determine toll amounts, based on a toll schedule received from T1 transmitters. The microprocessor also controls decoding and interpretation of encoded signals, in a manner described in greater detail hereinafter. The RAM element 54 preferably provides sufficient non-volatile memory to store toll data for a large number of toll authority accounts.

The IVC antennas 58, 62 can be incorporated into the IVC, or a receptacle can be provided to attach to a conventional window-mounted antenna, similar to those employed in connection with cellular telephone devices.

The user interface elements preferably include user-operable keys 66, LCD or LED display units 68, and an audio alarm module 70. The display and audio alarm elements provide visual or audible alarm signals when necessary, while the keys and display elements enable the vehicle operator to obtain information relating to toll-money-available quantities for each toll authority account stored in the IVC RAM. The display and user interface keys, in combination with conventional EPROM-stored software routines for controlling the microprocessor, enable the user to view the balances of each account stored in the IVC RAM. In one embodiment, the user interface includes an alphanumeric display having two lines of 10 characters each.

The bi-directional communications port 64 enables other microprocessors, including toll authority data processors, to write data into, and read data from, the IVC RAM. These read/write functions, which include purchase of gross toll quantities, diagnostic operations, and report generation, are discussed in greater detail hereinafter.

The power supply elements preferably include a compact, user-replaceable long-life battery 74, such as a lithium power cell. These elements can also include an on/off switch incorporating a battery check position.

The IVC components depicted in FIG. 3 are conventional in design and construction, and the IVC can be constructed in accord with known transponder and microprocessor control principles. The illustrated IVC transponder/processor can be housed in a compact, portable enclosure adapted for removable attachment to a dashboard surface or other convenient location within the vehicle.

The combination of components depicted in FIG. 3 enables the IVC to process fixed toll and progressive toll transactions. Additionally, the IVC can store and process different toll values for various toll authorities, toll facilities, and toll booths, so that a single IVC can accommodate multiple toll authorities and the expanded progressive toll tables required for multiple vehicle classes.

In particular, the IVC receives, decodes, and stores the T1 transmitter signal, interprets the stored signal, calculates the required toll amount based upon the stored signal, store the calculated toll amount, and debits the calculated amount at the toll facility in response to a COLLECT signal from the T2 transmitter. The IVC debits the calculated toll quantity from the appropriate account and transmits an acknowledgement signal that includes a vehicle-class message and confirmation of the debit operation.

As discussed in further detail below, the acknowledgement signal takes the form of an encoded logical response to the COLLECT signal from the T2 transmitter. The acknowledgement is dependent upon the content of the COLLECT message.

Following transmission of the acknowledgement, the IVC remains inactive until it passes through another T1 field. The IVC thus consumes power intermittently, and only when required for toll data processing. This feature reduces average power demands, and significantly extends battery life.

IVC Data Fields

In one practice of the invention, toll account information stored in the IVC includes individual toll road files having data fields with the following information:

| Field | Size |
|---|---|
| Start File | 2 bits |
| Toll Facility Name | 10 bits |
| Previous Balance | 6 bits |
| Amount Debited | 6 bits |
| Amount Credited | 6 bits |
| Current Balance | 6 bits |
| End File | 2 bits |

Those skilled in the art will appreciate that the invention can be practiced in connection with other data field parameters.

Each data file can be manipulated and edited as required for individual transactions between the IVC and the toll collecting T2 module, or between the IVC and the toll authority data processing system, as described in greater detail hereinafter.

IVC Operational States

In accord with one embodiment of the invention, the IVC unit can utilize the following operational states:

| State Number | Description |
|---|---|
| 0.0 | IVC off. |
| 1.0 | IVC switched on. |
| 1.1 | Upon switching on, lack of response signifies that the system is inoperable. |
| 1.2 | Upon switching on, system comes up, executes battery check, displays "OK" message, sounds beep. |
| 1.2.1 | Upon switching on, system comes up, executes battery check, detects low battery condition, displays "LOW BATTERY" message, sounds beep. |
| 1.2.2 | IVC enters hibernation -- a state in which little or no power is consumed, and the IVC waits to sense a signal. |
| 1.2.3 | IVC detects a transmission, exits hibernation and prepares to read encoded message. |
| 1.2.3.1 | Attempts to read message, fails three times, displays "error" and "proceed", sounds beep. |
| 1.2.3.2 | Reads message correctly, verifies correct read. |
| 1.2.3.2.1 | Checks whether message is T0, T1, T2. |
| 1.2.3.2.1.1 | Determines that message is T0. |
| 1.2.3.2.1.1.1 | Sounds beep, deletes from memory all current travel data" -- i.e., current memory for current trip. |
| 1.2.3.2.1.1.2 | Saves to "travel data" record, enters hibernation |
| 1.2.3.2.1.2 | Determines that message is a T1 record, will not read another T1 record for 2 minutes. |
| 1.2.3.2.1.2.1 | Determine whether T1 message is fixed or progressive. |
| 1.2.3.2.1.2.1.1 | Determines that T1 record is progressive |
| 1.2.3.2.1.2.1.1.1 | Looks for T0 in "travel data" memory, not found. |
| 1.2.3.2.1.2.1.1.1.2 | Sounds beep, displays "error" and "proceed". |
| 1.2.3.2.1.2.1.1.3 | Enters hibernation. |
| 1.2.3.2.1.2.1.1.2 | Looks for T0 in "travel data", finds T0 record |
| 1.2.3.2.1.2.1.1.2.1 | Sounds beep, displays "OK", calculates toll due |

-continued

| State Number | Description |
|---|---|
| | at next T2 based on comparison between T0 record and current record, deletes previous T1 record if any in "travel data". |
| 1.2.3.2.1.2.1.1.2.2 | Enters hibernation. |
| 1.2.3.2.1.2.1.2 | Determines T1 record is of fixed toll type. |
| 1.2.3.2.1.2.1.2.1 | Deletes previous T1 record (if any in "travel data"). |
| 1.2.3.2.1.2.1.2.2 | Sounds beep, displays "OK", calculates toll. |
| 1.2.3.2.1.2.1.2.3 | Goes into hibernation. |
| 1.2.3.2.1.3 | Determines the message is a T2 record. |
| 1.2.3.2.1.3.1 | Returns acknowledgement encoded with vehicle type, deletes toll amount from specified account. |
| 1.2.3.2.1.3.2 | Sounds beep, displays "OK", "Thank You". |
| 1.2.3.2.1.3.3 | Clears all "travel data". |
| 1.2.3.2.1.3.4 | Enters hibernation |
| Default Logic: | |

If an IVC having no "Travel Data" in memory receives a T2, it reads the default toll from T2 record and deletes the default amount from the appropriate account.

IVC Toll Calculation Logic

Fixed Tolls: The IVC passes through a fixed-toll T1 field and receives an encoded T1 record indicating a fixed toll. The IVC then calculates the toll due at the next T2 site, based on the fixed rate found in the toll schedule field. If the IVC passes through another T1 prior to encountering a T2 field, the IVC deletes the old T1 record and replaces it with the new T1 record.

Progressive Tolls: The IVC passes through a T0 field and the encoded T0 record is stored future processing. This record includes the following:

| | |
|---|---|
| 1. Start message | 2 bits |
| 2. Toll facility identifier | 6 bits |
| 3. Direction identifier | 2 bits |
| 4. T0 identifier | 2 bits |
| 5. End message | 2 bits |

Upon receiving a T0 message the IVC deletes all "Travel Data" in memory.

As the IVC passes through a T1 field, it receives an encoded record indicating a progressive toll, as follows:

| | |
|---|---|
| 1. Start message | 2 bits |
| 2. Toll facility identifier | 6 bits |
| 3. Direction identifier | 2 bits |
| 4. T1 identifier | 2 bits |
| 5. Toll type (progressive or fixed) | 2 bits |

-continued

| | |
|---|---|
| 6. Toll schedule | 256 bits |
| 7. End message | 2 bits |

Having received the T0 and T1 records, the IVC calculates the toll due at the next T2 it encounters. If the IVC passes through another T1 field before it encounters a T2, the IVC deletes the previous T1 record, replaces it with the new T1 record, and recalculates the toll due.

Upon passing through to a T2 the IVC debits the appropriate toll from the specified IVC toll authority account.

The entire T2 record includes the following:

| | |
|---|---|
| 1. Start message | 2 bits |
| 2. T2 identifier (simply states that the transmitter is a T2) | 2 bits |
| 3. Toll authority/booth identifier | 6 bits |
| 4. Direction identifier | 2 bits |
| 5. Default toll amount | 8 bits |
| 6. End message | 2 bits |

These T0 and T1 records contain all data required for calculating a progressive toll. The direction identifier can be use in error detecting calculations.

The 256 bit toll schedule field in the progressive-toll T1 record is a matrix of toll values based on entry points (A-C in this example) and exit points (A-C) specified in the T0 and T1 records, respectively:

| | A | B | C |
|---|---|---|---|
| A | 0 | $ | $ |
| B | $ | 0 | $ |
| C | $ | $ | 0 |

T0, T1 Transmitters

Figure 4:
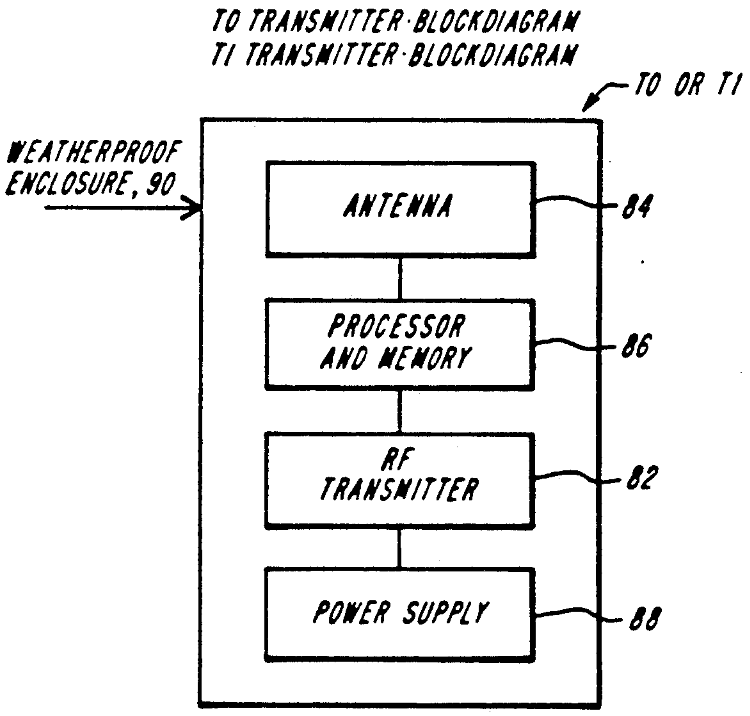
FIG. 4 is a block diagram depicting detail of T0 and T1 transmitters constructed in accord with the invention.

FIG. 4 depicts the structure of entry ramp transmitters T0 and toll-facility-identifier transmitters T1 constructed in accordance with the invention. Those skilled in the art will appreciate that while the illustrated T0 and T1 transmitters utilize radio frequency signal generating elements, the invention can also be practiced in connection with transponder components utilizing infra-red (IR) or other radiant electromagnetic energy wavelengths.

As discussed above, the T0 transmitters and T1 transmitters repeatedly emit an encoded signal that provides the IVC transponder elements with data required for toll calculation and collection.

The T0 toll-facility-identifier signal field is encoded with the following record:

1. Start message flag.
2. Toll identifier (identifies toll facility)
3. Direction identifier
4. T0 identifier (not a number, simply identifies signal source as a T0)
5. End message flag.

The T1 message is encoded with the following record:

1. Start message
2. Toll identifier (identifies toll facility)
3. Direction (A or B)
4. Toll schedule
5. T1 identifier (not a number, simply identifies signal source as a T1)
6. Toll type (progressive or fixed)
7. End message The toll schedule identifies tolls and their breakdown by vehicle type. The T1 signal is incrementally receivable, in that the IVC checks for the required data among the received messages and stores only the message it requires.

The START and END message bits are significant in assuring that individual IVC units read only complete messages, and do not attempt to read a message already in progress.

Each of the illustrated transmitter units T0, T1 includes a conventional RF transmitter 82 and antenna element 84, microprocessor and associated erasable programmable read-only memory (EPROM) 86, and power supply elements 88. The EPROM stores software for control and operation of the transmitters. These components are conventional in design and materials, and the transmitters can be constructed in accordance with known engineering practice. The complete T0 and T1 assemblies are preferably enclosed in a rugged weatherproof housing 90, to withstand the ranges of temperature, humidity, and ultraviolet radiation typical of the roadway environment. The T1 transmitter can be activated by an infra-red or optical vehicle detector, so that the T1 transmitter emits signals only when a vehicle is in proximity to the transmitter.

T2 Transmitter

Figure 5:
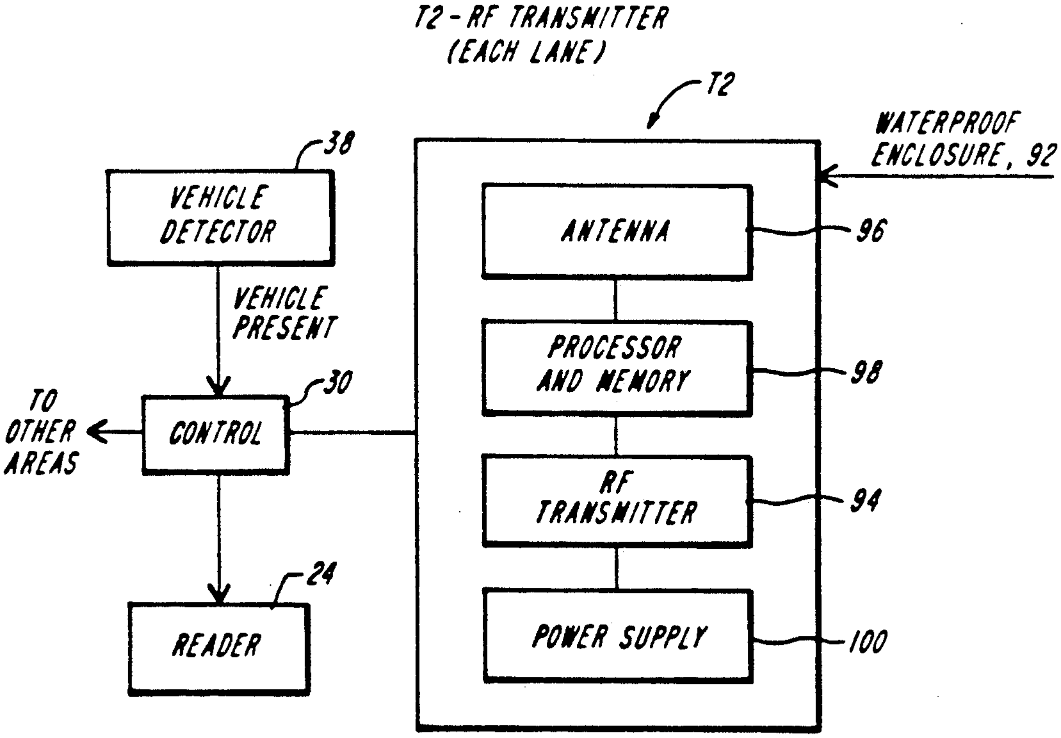
FIG. 5 is a block diagram depicting a T2 transmitter subsystem constructed in accord with the invention.

FIG. 5 depicts a toll-collect transmitter T2 in accord with the invention, for transmitting a TOLL-COLLECT signal instructing the IVC to debit the calculated toll amount. In one embodiment of the invention, the TOLL-COLLECT signal is a digital signal containing four bytes of data.

The T2 transmitter is preferably enclosed in weatherproof housing 92, and includes a conventional RF transmitter module 94 and associated antenna elements 96, a microprocessor, an EPROM for storing control software 98, and power supply elements 100. While the illustrated T2 transmitter includes radio frequency signal generating elements, the invention can also be practiced in connection with transponder components utilizing infra-red (IR) or other radiant electromagnetic energy wavelengths.

The T2 signal is encoded with the following information:

1. Start message flag.
2. T2 identifier (not a number, simply states it is a T2).
3. Toll identifier (includes toll authority and toll booth)
4. Direction identifier
5. Default toll amount—the amount debited if the T0 entry-point-identifier is lost or otherwise not present.
6. End message flag.

Toll Facility Hardware

In the embodiment depicted in FIGS. 1 and 5, the T2 transmitter is electrically connected to a transmitter control unit (TCU) 30 and a vehicle detector 38. The vehicle detector can be, for example, a photoelectric cell, located within ten to fifteen feet of the T2 transmitter, for optically sensing the presence of a vehicle and generating a VEHICLE PRESENT signal. When the VEHICLE PRESENT signal is relayed to the TCU, the TCU directs the T2 transmitter to transmit the COLLECT message. Thus, the T2 transmitter for a given lane emits a COLLECT signal only when a "target" vehicle is present in the lane, as indicated by the VEHICLE PRESENT signal.

The transmitter control unit is also interconnected with an acknowledgement signal reader unit 24. The reader unit 24, which utilizes conventional RF receiver elements, receives acknowledgment signals—and the vehicle-class identifiers contained therein—from each vehicle's IVC, to confirm that a toll debit transaction has been completed. The reader unit can be mounted on the leading edge of the toll facility canopy, angled downward toward oncoming traffic. Multiple reader units covering one direction of traffic at a single toll barrier can be connected to a reader control unit (RCU) that executes diagnostics, records activity in each lane, and forwards records of the activity to the TTM for further processing.

Figure 6:
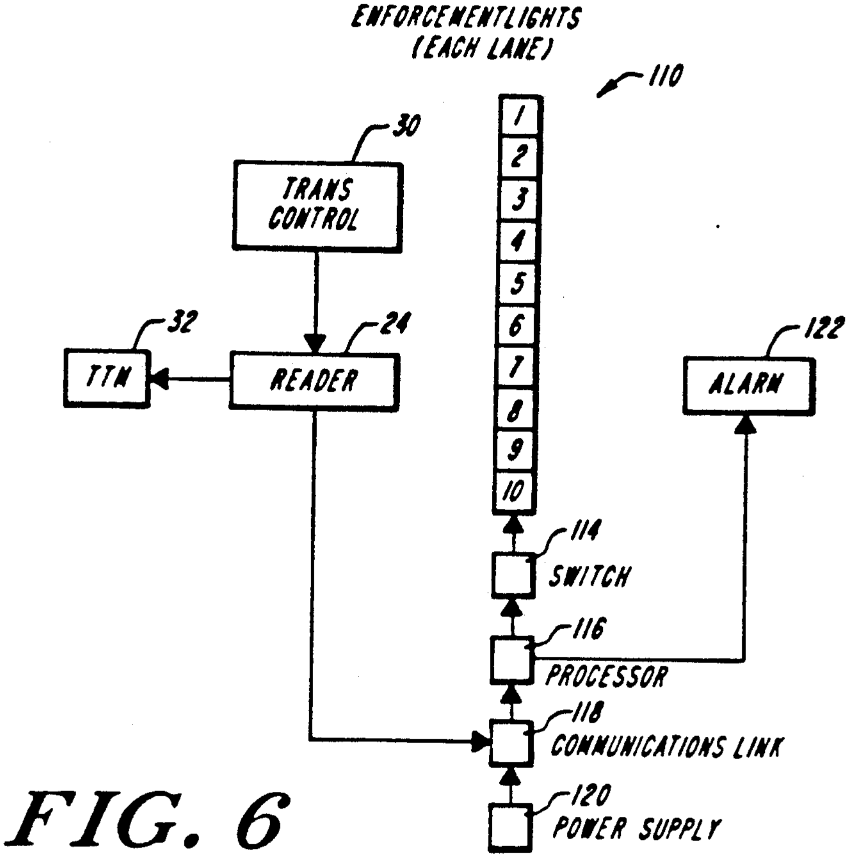
FIG. 6 depicts an enforcement subsystem utilized in the embodiments of FIGS. 1 and 2.

Each time the reader unit receives an acknowledgement signal, the reader unit transmits the vehicle identifier to the enforcement subsystem depicted in FIG. 6.

The enforcement subsystem 100 is provided to reduce the possibility of toll evasion. More particularly, in automated toll collection systems utilizing a conventional enabling device such as a magnetic card, tolls can be evaded by utilizing an enabling device designated for a low-toll vehicle class, such as an automobile, in a truck or other high-toll vehicle. The enforcement subsystem 100 addresses this problem. The subsystem shown in FIG. 6 governs one automated lane. It includes a vertical array of ten indicator lights 112 housed within a weatherproof, substantially cylindrical enclosure; a switch unit 114, a processor 116, a communications link 118, a power supply 120, and an alarm 122. Each indicator light in the light array represents a different class of vehicle—bus, car, truck, or other. The microprocessor 116 controls the switch 114 to energize a selected indicator light, in response to signals from the reader unit 24 for the lane. Signals generated by reader unit 24 are relayed to the processor 116 via communications link 118.

Each time the reader unit 24 receives an acknowledgement signal and vehicle-class identifier from an IVC in the lane, the reader transmits the vehicle-class identifier to the communications link, processor, switch, and light column, thereby causing a single selected indicator light to be energized. The selected light is representative of the vehicle class specified by the IVC in the vehicle currently passing through the corresponding lane of the toll facility. Enforcement personnel can then monitor the light column for each automated lane to confirm proper correspondence between visually observed vehicle class and vehicle class indicated by each IVC. Lack of proper correspondence indicates that the IVC in the current vehicle is incorrectly initialized for the class of vehicle in which the IVC is installed.

Moreover, if the vehicle detector for a given lane detects a vehicle, but the reader does not receive a proper acknowledgement signal within a predetermined interval of time, the enforcement processor activates the alarm module. The alarm module can include audible and visible alarm elements such as buzzers and strobe lamps.

RF Isolation

Figure 7:
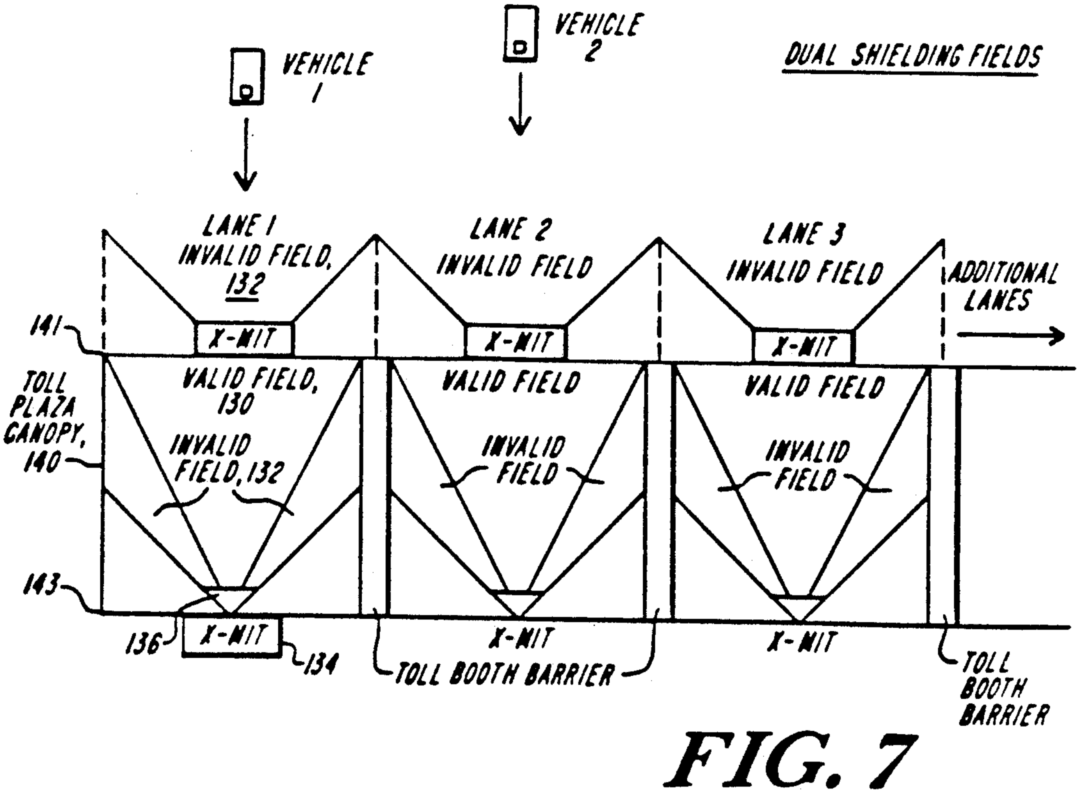
FIG. 7 depicts RF shielding fields generated in accord with the invention.

When the invention is practiced in a multiple-lane embodiment, the possibility exists that an IVC or reader unit operating in one lane will inadvertently detect signals generated by transmitters operating in adjacent lanes. The resulting confusion could frustrate system users or permit toll evaders to exploit the automated system. Consider, for example, first and second vehicles and respective IVC units approaching a multi-lane automated toll facility in adjacent first and second lanes, as depicted in FIG. 7. For purposes of this example, the second vehicle is behind the first. When the first vehicle enters the toll collection zone in the first lane, the T2 transmitter for the first lane transmits a TOLL COLLECT signal. In the absence of appropriate isolation, the second IVC, in the second lane, may receive the COLLECT signal intended for the first vehicle, and transmit an acknowledgement before reaching the second lane toll collection zone. The second vehicle's IVC would subsequently fail to generate the appropriate acknowledgement signal when it reaches the second lane collection zone.

Conversely, without proper isolation, the acknowledgement generated by the first IVC in the first lane may enable a toll evader in the second lane to pass through the second lane toll collection zone without generating a proper acknowledgement, and without triggering an alarm.

Thus, certain measures must be employed to reduce the possibility of RF crosstalk between multiple lanes, and to increase longitudinal discrimination between individual vehicles in a single lane.

To permit the reader unit to discriminate between an acknowledgment from a target vehicle IVC and "false" acknowledgements from adjacent vehicles or other sources, the control unit (FIG. 5) prevents the reader unit from detecting acknowledgment signals until the vehicle detector generates a VEHICLE-PRESENT signal indicating physical proximity of a vehicle in the lane.

Additionally, each IVC is programmed to generate its acknowledgement signal within a predetermined number of milliseconds after the T2 transmitter emits the COLLECT signal, and the corresponding reader unit checks for the acknowledgment only during this time window. Enabling the reader unit only when a VEHICLE-PRESENT signal is generated, and using a limited time window for acknowledgement transmission and detection, provides a temporal distribution of acknowledgment signals, thereby reducing the probability that a reader unit for a first lane will detect an acknowledgement from an IVC in an adjacent second lane.

Isolation can also be provided by controlling the transmission time of TOLL-COLLECT signals transmitted from adjacent lanes such that transmission of TOLL-COLLECT signals and subsequent detection of acknowledgement signals occurs serially, in only one vehicle lane at a time.

Another approach involves enhancement of RF isolation by configuring the T2 module to generate dual RF fields, as depicted in FIG. 7. One field 130, directed at the intended incoming target vehicle, carries a valid encoded TOLL-COLLECT message. A second field 132, directed at vehicles behind and on either side of the target vehicle, effectively isolates nearby vehicles from the COLLECT message, so that only the target vehicle, which is in close proximity to the T2 transmitter and the reader unit, can receive the T2 TOLL-COLLECT message and generate an acknowledgement. The continuously repeating shielding field signal 132 is not encoded, but in one embodiment of the invention is used to initialize incoming IVC units by incorporating values instructing the IVC units to prepare to receive a valid, encoded COLLECT signal.

RF shielding elements in accord with the invention, including transmitters 134, antennas 136, and shielding fields 132, are depicted in FIG. 7. The illustrated embodiment utilizes multiple shielding field transmitters 134 having antennas 136 oriented at selected angles to generate overlapping radio fields. This configuration isolates, or shields, a selected "VALID" region in which a T2 TOLL-COLLECT signal or other "VALID" transmission can be received. The shielding transmitters 134 utilize at least two antennas 136. These emitters continuously transmit a time-invariant RF signal that is not encoded. The shielding signal is thus a NO-OP or NO-COLLECT signal that IVC units do not recognize as an instruction to execute a debit operation.

As indicated in FIG. 7, the shielding field RF transmitters 134 and associated antennas 136 are arranged to provide fields 132 having overlapping lobes. Within the shielding field overlap regions, the average amplitude of the shielding signal is higher than that of the T2 COLLECT signal, effectively "blanking out" the COLLECT signal. This configuration provides RF isolation between vehicles in adjacent lanes.

Operation of the shielding elements exploits the fact that the IVC will recognize a COLLECT message only in those regions where sufficient "VALID" signal amplitude is present—i.e., in the "VALID" regions where shielding field lobes do not overlap.

The shielding field antennas 136 can be mounted in selected locations on the toll facility canopy 140, and each antenna can be rotated to selected angular orientations with respect to other antennas in the subsystem, to optimize RF isolation between vehicles and lanes. Preferably, a number of shielding field antennas 136 are located on the leading edge 141 of the toll facility canopy 140, oriented generally toward on-coming traffic, and angled approximately 45 degrees downward from the horizontal plane. Shielding signals of either a single frequency or multiple frequencies can be generated by one or more shielding field transmitters 134.

Isolation between multiple vehicles in a given lane, and isolation from T2 signals from adjacent lanes, is enhanced by utilizing directional antennas in the T2 transmitters, to focus the emitted T2 radio field downward onto oncoming vehicles.

In operation, when the IVC approaches the toll plaza, having already calculated the appropriate toll, the IVC encounters the shielding field, and responds by preparing to receive the encoded "valid" T2 field. The T2 "valid" transmitter, which can be mounted on the toll collection facility canopy approximately midway between the leading and trailing edges 141, 143 of the canopy 140, transmits its TOLL-COLLECT instruction when triggered by the vehicle detector. The IVC debits the toll amount and responds within a predetermined time interval by transmitting a message simply confirming the debit transaction and identifying the vehicle type. In one embodiment of the invention, this acknowledgement signal is a digital signal containing four bytes of digital data.

The RF shielding system can also be used in conjunction with T0 on-ramp transmitters, by transmitting a non-encoded second field that shields vehicles traveling on the progressive toll roadway from the T0 on-ramp signal.

The illustrated shielding field configuration can also be employed for position detection. In particular, when a signal having a selected frequency is transmitted at different amplitudes from each of the antennas, the relative position of a receiver with respect to the antennas can be determined on the basis of amplitude variations in the received signal as the receiver passes through the overlapping shielding fields. When signals of different frequencies or encoded variations of a single frequency are transmitted from each of the antennas, the relative position of a receiver with respect to the antennas can be determined from differences between received signals as the receiver passes through the overlapping shielding fields.

Toll Transaction Management

In order for an automated toll system to gain wide acceptance, it should provide information and records for accurate accounting of traffic activity and toll transactions at each toll booth and toll facility. The system should also expedite the toll purchase process.

Figure 8:
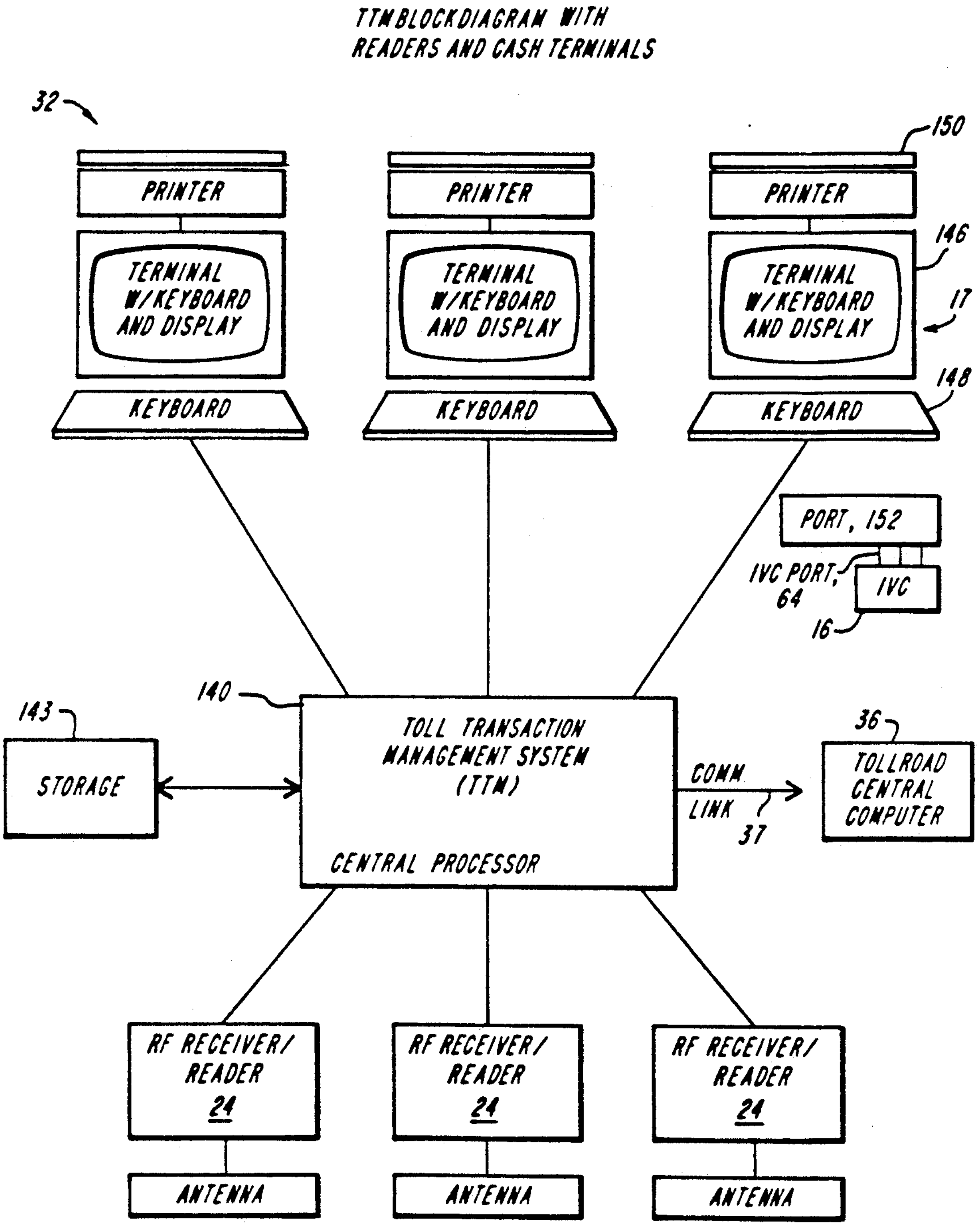
FIG. 8 is a block diagram of a Toll Transaction Management (TTM) systems utilized in the embodiments of FIGS. 1 and 2.

These advantages are provided in one practice of the invention by the Toll Transaction Management (TTM) subsystem 32 depicted in FIG. 8, which monitors toll collection, enables toll purchase and IVC loading, and generates reports on toll purchase, toll collection, and traffic activity.

The TTM subsystem 32 maintains records of all cash transactions—i.e., toll amount purchases—and automated toll debit transactions. These records are maintained and formatted for periodic down-loading to the toll authority central computer. The TTM can also execute diagnostic tests on each IVC as required, and verify the status of the toll accounts in each IVC, as described in greater detail hereinafter.

The TTM subsystem includes a central processor 140, cash terminals 17 in communication with the central processor 140, and a communications link 37 for bi-directional data communications with a toll authority central computer 136. The subsystem can also include a data memory and storage module 143 having conventional RAM, magnetic, optical or other digital data memory and storage elements.

The TTM central processor 140 can be a conventional microcomputer or minicomputer, depending upon the size and data-handling requirements of the automated toll system. The central processor is interconnected with the reader units 24 in each automated lane, to gather toll collection data including vehicle-class-identifiers, transaction time, and lane-by-lane traffic activity information. Where required, remote communication between the reader units and TTM central processor can be provided by modems or other data communications devices.

The cash terminals 17 include a conventional display 146, keyboard 148, and printer 150. The terminals also include an RS-232 or other conventional communications port 152 adapted for connection to a similar port 64 on each IVC unit (See FIG. 3). Using the communications port 152, the cash terminals 17 enable vehicle operators to credit their IVC accounts—i.e., load selected toll-money-available quantities—by prepaying selected toll amounts.

When a motorist wishes to prepay tolls and load the IVC, the motorist proceeds to a local toll facility and gives the IVC to a toll collection agent with cash or a credit card authorization equal to the toll amount the motorist wishes to prepay. The toll collection agent connects the IVC communications port 64 to the cash terminal communications port 152, and enters into the cash terminal the monetary amount to be stored in the IVC memory for a specified toll authority account.

The cash terminal 17 transmits a signal to the IVC 16, indicating a credit for the specified monetary amount to the selected account in the IVC. The cash terminal also prints a receipt verifying the credit to the account. This receipt can specify all toll transactions involving the IVC since the previous cash transaction. The cash terminal 17 then communicates with the Toll Transaction Management (TTM) central processor 140 to confirm the cash transaction. This information is retained in the memory 143 of the TTM for further processing, storage, and communications with the toll agency central computer.

In addition to toll purchases and other cash transactions, the cash terminal 17 can also interrogate individual IVC units 16 to produce printed diagnostic reports or travel data reports.

As indicated in FIG. 8, the TTM central processor 140 is connected to each reader unit 24 in the toll facility. When a reader unit 24 receives an acknowledgement and vehicle-class identifier from an IVC, the reader unit 24 relays the vehicle-class identifier to TTM central processor 140 for formatting, further processing, and storage. The formatted record generated by the TTM for each debit transaction is referred to as a Toll Transaction Record.

In addition to Toll Transaction Records, the TTM subsystem configuration depicted in FIG. 8 is capable of generating various records for use by each toll authority. While the number and type of such records will vary, depending upon toll authority requirements, the TTM subsystem can generate Cash Transaction Records, Traffic Records, and Cash Summary Records. The Cash Transaction Record is generated by the TTM, as described above, each time a motorist credits his or her IVC accounts by prepayment of a selected toll amount.

The TTM generates Traffic Records by summarizing relevant data from each incoming Toll Transaction Record. The Traffic Record is then relayed to the Toll Authority's central computer. The Cash Summary Record is generated by the TTM by processing all incoming Cash Transaction Records. The Cash Summary Record is also transmitted to the Toll Authority's central computer. Examples of data fields for each of these records is set forth below.

Because each of these records is intended for ultimate use by different toll authority computers, a standard data format should be utilized for communications with external toll authority processors. Current research indicates that most toll authority computers can read and write ASCII flat files. Thus, in one practice of the invention, the TTM generates files having an ASCII format, enabling standardized output to toll authority computers.

The TTM functions of creating and sorting records based on cash transactions, debit transactions, and traffic activity in each lane, can be provided by utilizing a commercially available database program such as Oracle or Dbase III. Traffic and financial transaction records can be stored, tracked and displayed on the TTM cash terminal display units 146.

In addition, a plurality of TTM subsystems can be distributed along a progressive toll road, with conventional network communications between the TTM subsystems and a mainframe computer at the toll authority headquarters.

TTM Data Fields

Each of the TTM Records described above contains selected information relating to toll transactions. Data fields utilized in one practice of the invention are set forth below, by way of example. Those skilled in the art will recognize that the invention can be practiced with data fields other than those set forth below. In each case, data can be transferred to the TTM on a real-time basis as fixed format ASCII records. Each record is terminated by a carriage return/line feed sequence and commences with a "record type" indicator. Whenever a data is required, fields can be date and time stamped in a year-month-day-hour-minute-second format.

| FIELD | SIZE | DEFINITION |
|---|---|---|
| | TOLL COLLECT DATA FIELDS | |
| record type | 2 | identifies record type |
| barrier/lane number | 8 | 4 digits identify |
| barrier number | | 4 |
| digits identify | | |
| lane number | | |
| vehicle type | 4 | identifies vehicle type |
| end message | hard rtrn | ends record |
| | TOLL PURCHASE/CASH TRANSACTION DATA FIELDS | |
| record type | 2 | identifies record type |
| barrier/ number | 8 | 4 digits identify barrier |
| lane number number | | 4 digits identify lane |
| IVC serial num. | 8 | identifies IVC unit |
| amounted credited | 6 | amount purchased 9999.99 |
| current balance | 6 | current balance 9999.99 |
| end record | hard rtrn | ends record |
| | TRAFFIC RECORD DATA FIELD | |
| record type | 2 | identifies record type |
| from date/time stamp | 14 | record covers from - to |
| current date/ time stamp | 14 | record covers from - to |
| barrier/ lane number | 8 | 4 digits identify barrier number 4 digits identify vehicle type |
| vehicle type | 4 | 4 digits identify vehicle type |
| vehicles through vehicles through vehicles through vehicles through vehicles through | 6 | 6 digits identify number of vehicles through lane (8 vehicle types, repeats based on number of lanes in system) |
| end record | hard rtrn | ends record |
| | CASH SUMMARY DATA FIELD | |
| record type | 2 | identifies record type |
| from date/time stamp | 14 | record covers from - to |
| current date/ time stamp | 14 | record covers from - to |
| Terminal num. | 4 | identifies cash terminal |
| total cash in | 6 | total cash in |
| | (repeats last two fields for every cash terminal in system) | |
| end record | hard rtrn | ends record |

Signal Encoding

Figures 9A, 9B:
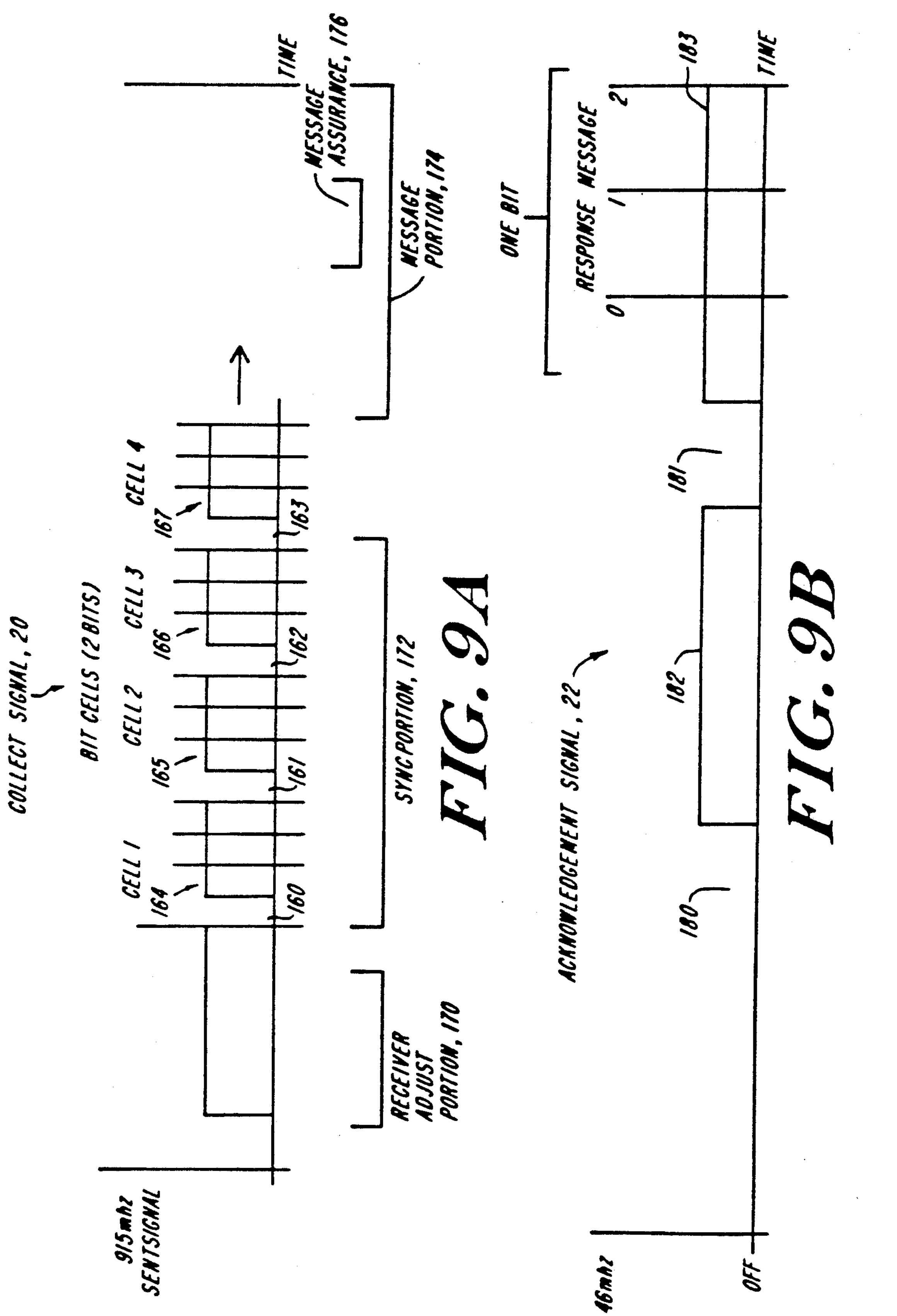
FIGS. 9A and 9B depict a simplified form of the COLLECT signal generated by the T2 transmitter, and a simplified form of the acknowledgement signal generated by the IVC in accord with the invention.

FIGS. 9A and 9B depict COLLECT and acknowledgement signals encoded in accordance with one practice of the invention. In accord with the encoding process, referred to herein as Digital Time Segment Modulation (DTSM), the carrier signal is present at substantially all times during the transmitter ON state, with brief intervals or gaps 160–163 inserted between digital time segments 164–167. The temporal position of each gap, which defines the length of each digital time segment, is a quantity representative of digital data. In particular, as depicted in FIG. 9, the position of each gap defines bit cells indicative of encoded information.

In the illustrated embodiment, the T2 transmitter emits a carrier signal at 915 MHz, and the acknowledgement signal is transmitted at 46 MHz. Those skilled in the art will appreciate, however, that the DTSM method can be utilized to encode information in electromagnetic signals of arbitrary wavelength or frequency.

As depicted in FIG. 9A, a typical transmitted signal includes a RECEIVER-ADJUST portion 170 during which the receiver adjusts to transmitted signal amplitude; a SYNC or synchronization portion 172 enabling synchronism between receiver and transmitted signal; and a MESSAGE portion 174. The message portion can contain a MESSAGE ASSURANCE portion 176, which includes at least one parity bit or checksum bit, for checking the accuracy of the message in accordance with conventional error checking practice.

The communications event typically includes the following operations:

1. The controller module for the toll facility (FIGS. 1, 2, and 6) receives a VEHICLE-PRESENT signal from the vehicle detector, indicating the presence of a vehicle in the corresponding lane.

2. The controller module for the toll facility activates the T2 transmitter.

3. The T2 transmitter emits an RF TOLL-COLLECT signal encoded in the manner described above and depicted in FIG. 9A.

4. The IVC receives the TOLL-COLLECT signal, debits the appropriate account, and transmits an acknowledgement signal (FIG. 9B) encoded in a similar manner, with gaps 180, 181 inserted between digital time segments 182, 183. The acknowledgement signal can be frequency modulated or amplitude modulated.

5. The toll facility receives the acknowledgement signal and energizes an appropriate signal light in the enforcement light column (FIG. 6).

The DTSM encoding system provides significant advantages over conventional phase, amplitude, or frequency modulation encoding. The carrier signal is present at substantially all times during the transmitter ON state, resulting in high average signal power, and enabling the use of a simple, moderate-sensitivity, low-cost receiver in the IVC to acquire the peak incoming signal. Additionally, the encoding provides a signal in which the data portion has a fixed, known location. The encoding also provides the receiver an extended opportunity to acquire the signal before transmission of the data portion. Moreover, the encoded signal is readily decoded, using conventional digital techniques.

In one embodiment of the invention, the starting position of the acknowledgement message is varied, based upon the time at which TOLL-COLLECT signal is transmitted, as well as upon the contents of the COLLECT signal. Additionally, to reduce the potential for unauthorized recording and reproduction of the acknowledgement signal, the TOLL-COLLECT message is not a fixed message. It is selected from a set of TOLL-COLLECT messages, each of which is recognized by the IVC as a TOLL-COLLECT message. Because the COLLECT message varies over time, and the acknowledgment signal depends upon the time and content of the COLLECT message, the required acknowledgement must also vary over time, so that a previously recorded acknowledgement is unlikely to be valid at a subsequent time.

The encoding system can also insert ancillary machine readable information and user-readable information, including spoken road condition reports for motorists or encoded data for on-board map display devices.

It will thus be seen that the invention efficiently attains the objects set forth above, among those made apparent from the preceding description. In particular, the invention provides methods and apparatus for remote, high-speed extraction of tolls from vehicles moving at high speeds. The invention thereby enables high levels of throughput that are unattainable by conventional toll collection systems. The system facilitates interaction with a plurality of toll authorities, and enables efficient, low-cost record-keeping and transaction reporting for vehicle operators and toll facilities. The invention enhances highway safety by reducing speed differentials in the vicinity of toll plazas, and is readily integrated into existing toll management systems.

It will be understood that changes may be made in the above construction and in the foregoing sequences of operation without departing from the scope of the invention. The illustrated radio frequency transmitters, for example, may be replaced by infra-red transmitters or emitters operating in other regions of the electromagnetic spectrum. Moreover, the invention can be practiced in connection with railway vehicles or other toll- or tariff-collection applications.

It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. Apparatus for automatic collection of tolls from a vehicle moving along a roadway, comprising onboard toll processor means carried by the vehicle for processing of toll transactions, the onboard toll processor means comprising:

memory means for storing a money-available signal representative of a monetary quantity available for debiting in a toll transaction at an upcoming first toll facility located at a first location, receiver means for receiving (i) a first toll-facility-identifier signal, said first toll-facility-identifier signal being a radiated electromagnetic signal generated at a first site proximate the roadway, the first site being spaced apart from an upcoming first toll facility location, said first toll-facility-identifier signal being representative of the location of the first toll facility, and (ii) a first toll-collect signal, generated at the first toll facility, instructing the onboard toll processor to debit a toll amount from said memory means, central processor means, including calculation means, coupled with said receiver means, and responsive to said first toll-facility-identifier signal, for calculating a first toll-due amount to be debited at the first toll facility, and debit means, coupled with said receiver means, and responsive to said first toll-collect signal, for modifying said money-available signal stored in said memory means to debit said calculated toll-due amount from said monetary quantity, and transmitter means, coupled to said debit means, for responding to said modification of said money-available signal by transmitting an acknowledgement signal indicating that the calculated toll amount has been debited from said monetary quantity.

2. Apparatus according to claim 1, wherein said onboard toll processor means further comprises user interface means, coupled to said central processor means, for generating a perceptible signal representing the monetary quantity corresponding to the money-available signal stored in said memory means.

3. Apparatus according to claim 1, wherein said onboard toll processor means further comprises machine interface means, coupled to said central processor means, for receiving an electronic gross-toll-amount signal representative of an initial money-available value.

4. Apparatus according to claim 1, wherein said memory means includes an alterable, non-volatile memory element.

5. Apparatus according to claim 1, wherein said central processor means further comprises signal validator means, coupled to said receiver means, for verifying that a received electromagnetic signal is either of (i) a first toll-facility-identifier signal, or (ii) a toll-collect signal.

6. Apparatus according to claim 1, wherein said receiver means comprises a crystal oscillator circuit and an amplifier circuit.

7. Apparatus according to claim 1, wherein said onboard toll processor means further comprises antenna means, coupled to said receiver means and to said transmitter means, for collecting and radiating electromagnetic signals.

8. Apparatus according to claim 7, wherein said antenna means and said receiver means are arranged for receiving electromagnetic energy signals of a first wavelength, and are arranged for transmitting said acknowledgment signal at a second wavelength.

9. Apparatus according to claim 1, wherein said memory means includes means for storing the calculated toll-due amount until said amount is debited in response to a received toll-collect signal.

10. Apparatus according to claim 1, wherein said memory means includes means for storing a vehicle-type-identifier value representative of a vehicle type to which the onboard toll processor means corresponds, and said acknowledgment signal includes a vehicle-type-identifier signal representative of said stored vehicle-type-identifier value.

11. Apparatus according to claim 1, wherein said onboard toll processor means further comprises means for storing electrical power.

12. Apparatus according to claim 1, wherein said toll-facility-identifier signal, said toll-collect signal, and said acknowledgment signal are encoded radio frequency signals, and said acknowledgment signal includes a modified reflection of the received toll-collect signal.

* * * * *